C. O. BENTON.
Hay-Loaders.
No. 150,224.
Patented April 28, 1874.
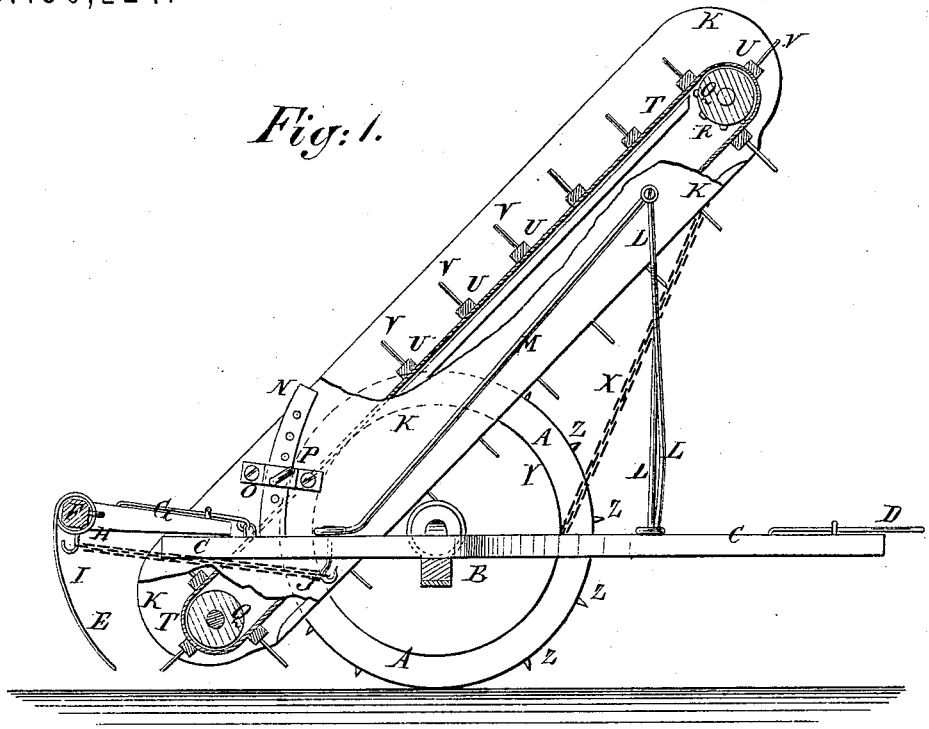
Fig. 1.
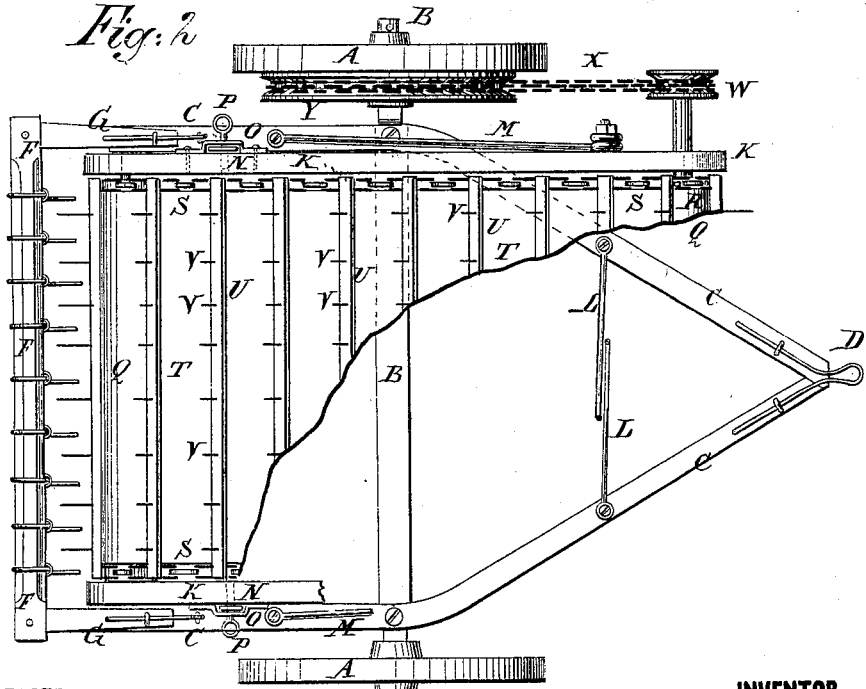
Fig. 2.
WITNESSES:
Fig. 3.
Fig. 4.
INVENTOR:
C. O. Benton
BY
ATTORNEYS.

UNITED STATES PATENT OFFICE.

CARMI O. BENTON, OF TOPEKA, KANSAS.

IMPROVEMENT IN HAY-LOADERS.

Specification forming part of Letters Patent No. 150,224, dated April 28, 1874; application filed February 14, 1874.

*To all whom it may concern:*

Be it known that I, CARMI O. BENTON, of Topeka, in the county of Shawnee and State of Kansas, have invented a new and useful Improvement in Hay Raker and Loader, of which the following is a specification:

Figure 1 is a side view of my improved machine, parts being broken away to show the construction. Fig. 2 is a top view of the same, part being broken away to show the construction. Fig. 3 is a top view of a portion of one of the endless-apron chains. Fig. 4 is an edge view of the same.

Similar letters of reference indicate corresponding parts.

The invention will first be fully described, and then pointed out in the claims.

A represents the wheels, which revolve upon the journals of the axle B, which axle is bent at right angles near each end, to bring the body or middle part of said axle sufficiently near the ground. To the axle B, at its bends, are attached the bars C, the forward parts of which incline toward each other, and to their forward ends, at their point of intersection, is attached an eye or loop, D, to hook upon a hook secured into the middle part of the axle of the wagon or cart. The rear parts of the bars C project to the rearward, and are parallel with each other, and at right angles with the axle B. E are wire rake-teeth, which are coiled around and attached to the head F, in the ordinary manner. To the ends of the rake-head F are rigidly attached the arms G, which project forward at right angles, and the forward ends of which are pivoted or hinged to the upper sides of the rear parts of the bars C near their ends. To the end of the rake-head F is attached a downwardly-projecting arm, H, to the end of which is attached the chain I, which extends forward, and its other end is hooked upon a hook, J, attached to the under side of the bars C, as shown in Fig. 1, to hold the rake down to its work. When passing from place to place, by unhooking the chain I, the rake may be turned up to rest upon the elevator-frame. K is the elevator-frame, which consists of two side-boards, which are connected and held in their proper relative position by cross-bars and rods. The frame K is placed in an inclined position, and its upper end is supported by the rods or bars L, the upper ends of which are attached to the outer sides of the side-boards of the frame K, near their upper ends. The rods L cross each other, as shown in Figs. 1 and 2, and their lower ends are attached to the forward parts of the bars C. The upper end of the frame K is further secured in place by the rods M, the upper ends of which are attached to the outer side of the upper parts of the side-boards of said frame by the bolts that secure the ends of the bars L. The lower ends of the rods M are secured to the upper sides of the rear parts of the bars C. The lower end of the elevator is supported, adjustably, in position by the curved arms N, the lower ends of which are secured to the inner sides of the rear parts of the bars C, and which pass through keepers, O, attached to the outer sides of the side-boards of the frame K, where they are secured in place by screws P passing through said keepers and arms, and screwing into the said side-boards. Several holes are formed in the curved arms N to receive the said screws P, so that the lower end of the elevator-frame K may be adjusted closer to or farther from the ground, as may be required. To the upper and lower ends of the side-bars of the frame K are pivoted rollers Q, to the upper one of which, at the inner sides of the side-bars of the frame K, are attached spur-wheels R, the spurs of which enter the open links of the endless chains S, which pass around the two rollers, Q. The chains S are made of alternate open and closed or plate links, as shown in Fig. 3, and to them are attached the edges of the endless apron T, which is made of canvas or other suitable material. To the endless apron T, at suitable distances apart, are attached cross-bars U, which are provided with prongs or fingers V, by which the hay collected by the rake-teeth E is taken from said teeth, carried up the frame K, and deposited upon the wagon or cart. To the projecting end of the journal of the upper roller Q is attached a small chain-wheel, W, around which passes an endless chain, X, which also passes around a larger chain-wheel, Y, attached to one of the wheels A, so that the elevator may be operated by the advance of the machine. The face of the wheel A, to which the chain-wheel Y is attached, should be provided with spikes Z, to keep it from slipping upon the ground.

Having thus described my invention, I claim as new and desire to secure by Letters Patent—

1. The combination, with the elevator, of bars C C, V-shaped in front, but parallel in the rear, the crank-axle B, the side rods M M, and the bent crossed rods L L, as and for the purpose set forth.

2. The combination of the curved and perforated arms N, keepers O, and screws P with the bars or frame C and the elevator-frame K, for securing the lower end of the elevator in place when adjusted, substantially as herein shown and described.

CARMI O. BENTON.

Witnesses:
D. H. FORBES,
J. C. McCLINTOCK, Jr.